United States Patent [19]

Fairhurst

[11] Patent Number: 5,283,652
[45] Date of Patent: Feb. 1, 1994

[54] PATTERN GENERATION USING WIPE SOLID GENERATOR

[75] Inventor: Jon A. Fairhurst, Grass Valley, Calif.

[73] Assignee: The Grass Valley Group, Inc., Nevada City, Calif.

[21] Appl. No.: 968,658

[22] Filed: Oct. 30, 1992

[51] Int. Cl.$^5$ ............................................. H04N 5/262
[52] U.S. Cl. ...................................... 348/594; 348/595
[58] Field of Search ............... 358/183, 182, 181, 160, 358/22; 340/706, 722, 734, 732

[56] References Cited

U.S. PATENT DOCUMENTS

| | | | |
|---|---|---|---|
| 4,805,022 | 2/1989 | Abt | 358/183 |
| 4,974,083 | 11/1990 | Bloomfield et al. | 358/183 |
| 5,046,030 | 9/1991 | Bitter et al. | 340/706 |
| 5,153,711 | 10/1992 | DesJardins | 358/182 |

*Primary Examiner*—James J. Groody
*Assistant Examiner*—Michael H. Lee
*Attorney, Agent, or Firm*—Francis I. Gray

[57] ABSTRACT

A method of pattern generation for a screen using a wipe solid generator and a recursive memory includes generating from operator inputs a wipe solid. An extent of the generated wipe solid is measured to produce maximum and minimum values. These maximum and minimum values are extended to encompass a desired border size and softness. A lever-arm scaling function is selected based upon whether a change in operator input causes a reversal in pattern and/or causes the pattern to "breathe." The selected lever-arm scaling function uses prior values from the recursive memory to generate new values that are stored in the recursive memory. From the stored values clip levels are determined such that completion of lever-arm movement to a limit position coincides with completion of the pattern without distortion of the size of the pattern.

5 Claims, 1 Drawing Sheet

PATTERN GENERATION USING WIPE SOLID GENERATOR

BACKGROUND OF THE INVENTION

The present invention relates to digital video signal processing, and more particularly to pattern generation using a wipe solid generator to provide scaling of a switcher lever arm during wipes between video images that always results in the pattern transition ending or beginning just as the lever arm reaches its limit.

Video switchers or mixers typically include pattern generators as a standard resource. These generators allow wipes from one video signal to another via a changing geometric shape, allow present pattern effects such as spotlights, darkened anonymous faces and split screens, and allow masking effects so that a key is active only within a certain region of a display screen. These pattern generators typically provide a variety of shapes, such as circle, square, diamond, heart, etc., and also include pattern modification controls for position, aspect, rotation, modulation, replication, edge softness and border width.

The wipe patterns are traditionally generated using a wipe solid approach as illustrated in U.S. Pat. No. 4,805,022 issued Feb. 14, 1989 to John Abt entitled "Digital Wipe Generator." To visualize this method, picture an inverted cone, pointing down. By applying a clip and gain function to this three-dimensional shape, a circle is generated. As the clip point moves from the bottom (point of the cone) to the top (base of the cone) of the inverted cone, the circle grows. This is how a circle wipe transition is formed. Many modifiers affect the wipe solid itself. By changing the location of the cone's point on the video screen, the wipe position is modified. By changing the symmetry of the cone, the aspect is changed. Rotation is accomplished by mixing the x and y coordinates of the cone via sine and cosine functions. Modulation is accomplished by varying the position of the cone with various waveforms. Multiple circles are generated by creating a wipe solid consisting of numerous cones. Other modifiers affect the clip and gains. A border is generated by using two clip and gain functions, each with a different clip. The clip separation defines the border width. A low gain produces a soft pattern. By inverting the gain and changing the direction of the clip, the pattern is reversed.

Several problems have traditionally plagued a wipe system. These problems include lever-arm scaling, constant position and consistent sizing.

1. Lever-arm scaling. Each modifier may potentially change the clip values at which the pattern first appears on the screen and vanishes from the screen. This causes difficulty in setting the clip range. Ideally the switcher's lever-arm which controls the clip values causes the pattern to start immediately after it is moved from its end stop, and the pattern vanishes just as the lever-arm travel is complete. Many current switchers lack dynamic lever-arm scaling. Wipes start and end partway through the lever-arm travel, and at extreme pattern positions the wipes "snap" to completion at the end of lever-arm travel.

2. Constant position. One solution to the lever-arm scaling problem is to center the pattern position as the wipe grows. This artifact is often undesirable. It also precludes numerous clip and gain resources from using the same wipe solid since the position of pattern 2 may be modified by the size, i.e., lever-arm position, of pattern 1.

3. Consistent sizing. Some generators provide lever-arm scaling to the detriment of pattern size consistency. A circle in the center of the screen must traverse one-half screen for the pattern to finish the transition. A circle starting from the screen's corner must traverse the entire screen to finish the transition. Therefore, a pattern at fifty percent (50%) lever-arm travel is twice as big if it originates from a corner than if it originates from the screen center. This operation is correct for static pattern position, but the pattern "breathes", i.e., grows or shrinks, as the pattern position is changed to traverse the screen while the lever-arm is not at an end stop. Further a normal wipe features a growing pattern which reveals the new video, while a reversed wipe features a shrinking pattern which conceals the old video. At ten percent (10%) into a circle wipe a small circle is exposed with the new video in the center. For a reversed circle wipe a ten percent transition reveals a large circle with the old video in the center. Pressing the reverse button in the middle of a transition causes the pattern to jump from large to small or vice-versa. What is desired is consistent size regardless of whether the new and old videos are swapped or the direction of movement changes.

SUMMARY OF THE INVENTION

Accordingly the present invention provides pattern generation using a wipe solid generator that provides lever-arm scaling while maintaining size consistency during pattern modification. The wipe solid generator includes H and V ramp generators, modulators, rotation and scaling matrix, offset adders and a variety of ALU functions as well as clip and gain circuits with an offset adder for the clip level, a barrel shifter and multiplier for a high range of gain, and limiters allowing an effective range from zero to unity. The wipe solid generator first generates the values that are used to produce a wipe solid. The minimum and maximum values of the wipe solid are then determined that describe the range of the clip as generated by the lever-arm. The clip range is extended to provide for borders, either sharp pattern edges or soft edges, so that the pattern is fully ON or OFF at the end of the lever-arm travel. Then the lever-arm is scaled by calculating the clip and gain values that are provided to the necessary hardware based upon the minimum, maximum, border and lever-arm position values using recursive values for dynamic scaling.

The objects, advantages and other novel features of the present invention are apparent from the following detailed description when read in conjunction with the appended claim and attached drawing.

DESCRIPTION OF THE PREFERRED EMBODIMENT

Figure 1:
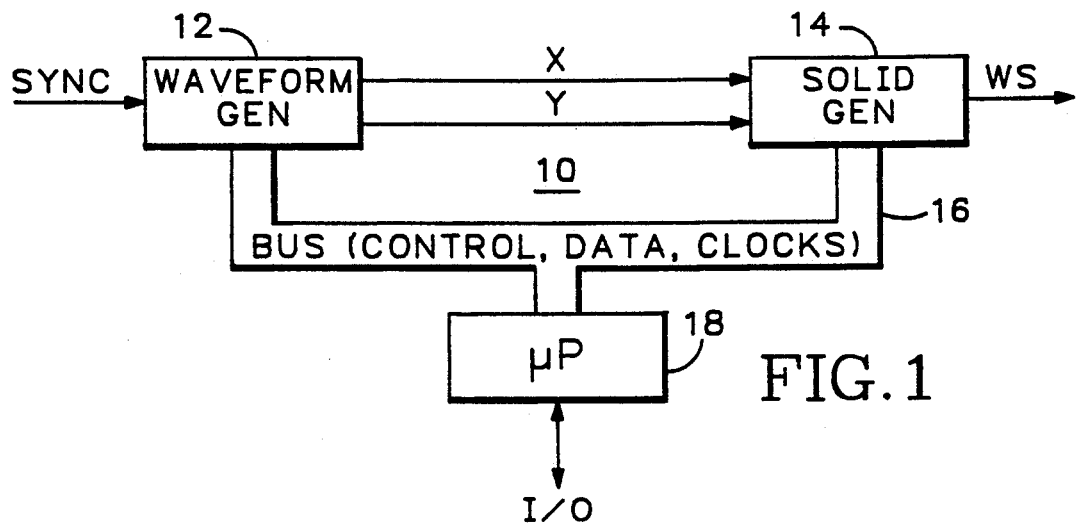
FIG. 1 is a block diagram of a wipe solid generator for generating patterns according to the present invention.
Figure 2:
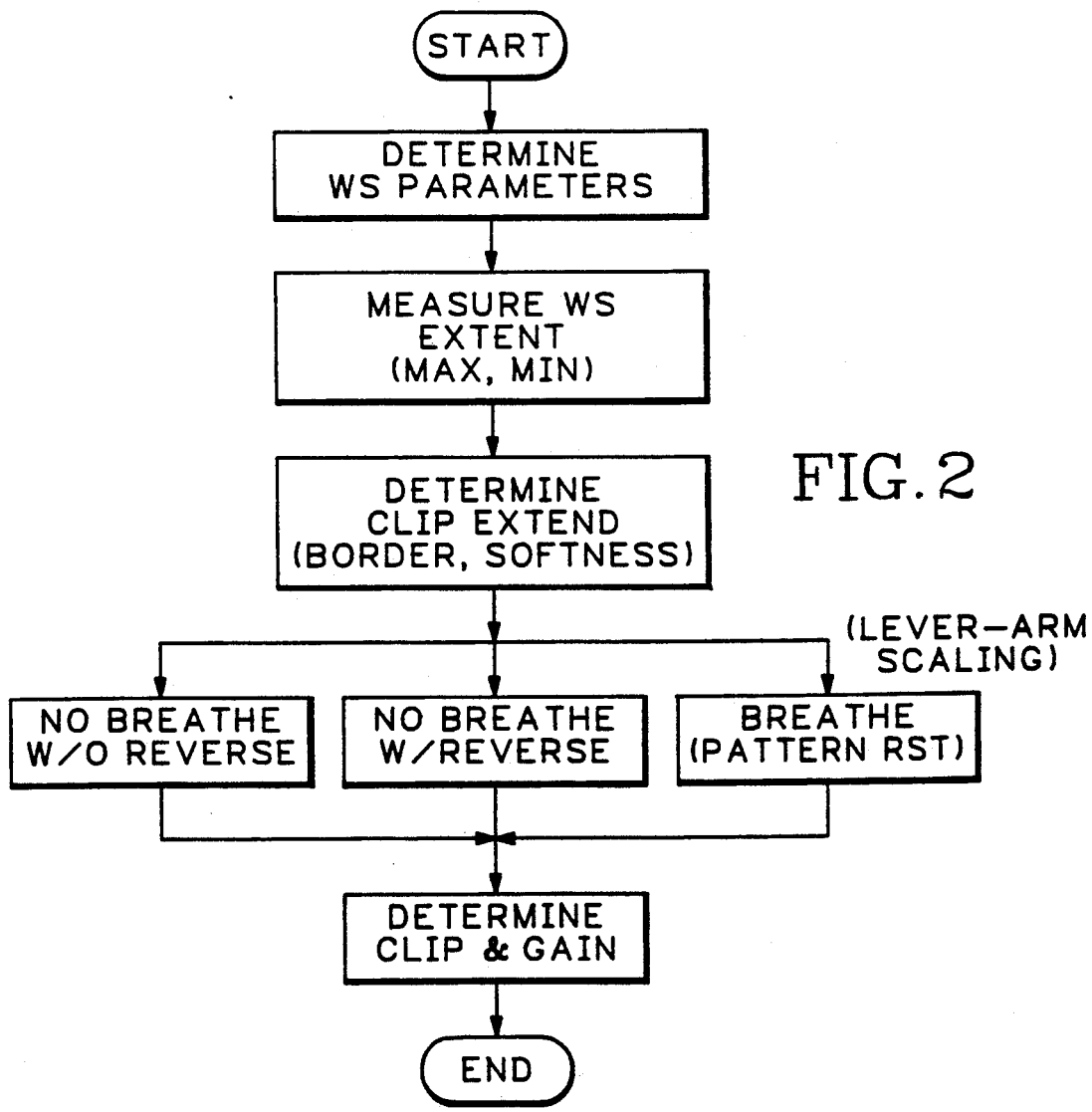
FIG. 2 is a flow chart for pattern generation using the wipe solid generator according to the present invention.

Referring now to FIG. 1 a wipe solid generator 10 has a waveform generator 12 that receives a video sync input, either composite sync or separated horizontal and vertical syncs, and produces X and Y output digital waveforms. The waveform generator 12 uses conventional H and V counters together with modulators, associated multipliers for rotation and adders for position adjustment. The X and Y waveforms are input to a digital solid generator 14, such as that disclosed in U.S. Pat. No. 4,805,022, to produce a wipe solid (WS) output digital waveform. The waveform generator 12 and solid generator 14 are connected together by a bus 16 to which also is connected a microprocessor 18. The microprocessor 18 provides appropriate control waveforms, data and clock signals to the various modules connected to the bus 16 according to inputs received via an input/output (I/O) port.

Within the waveform generator 12 the slope of the ramp generators is controlled by the microprocessor 18 according to the H and V increments for the respective counters used. The ramp generators output a sawtooth digital signal that is input to a sawtooth to triangle wave converter. Each cycle of the triangle wave output from the converter generates a pair of wipe solids. For non-replicated patterns the gain is set such that the full triangle covers a multiple of full video screens, such as six full video screens or one wipe solid per three video screens. The oversized pattern allows dynamic range for position and modulation functions. The H and V increments are increased for replicated patterns such that the triangle wave occurs multiple times per screen as necessary. The triangle wave ranges from $-1$ to $+1$.

The microprocessor 18 controls the initialization of the ramp generators by setting the position of the wipe solids. For non-repeated patterns only one slope of the triangle wave is generated during an active screen. The zero crossing is at the screen center for a centered position. By adding waveforms to the triangle waves modulation is achieved by a modulator. Modulation variables include frequency, phase and amplitude as well as waveform type for both H and V dimensions. Rotation is accomplished by mixing the modulated H and V triangles to form the X and Y outputs. Scaling to optimize dyanmic range and to set aspect ratio also are accomplished in the rotation matrix section according to the following functions:

$X = A1*H + B1*V$ $Y = B2*V + A2*H$ where A1, A2, B1 and B2 are generated by the microprocessor 18. Absolute value and invert functions follow the rotation matrix section. The X and Y waveforms without the absolute value function are used to generate edge to edge wipes, while the absolute value function is used to generate center to edge wipes like squares and diamonds. The invert function complements the slope of the ramps and triangles. Aspect adders may be used to modify the aspect of certain rectangular patterns like squares and corner wipes, the aspect values being provided by the microprocessor 18.

The X and Y waveforms are combined by an arithmetic logic unit (ALU) in the solid generator 14 to form the wipe solid (WS). Minimum and maximum functions are used for squares, rectangles and boxes, addition is used for diamonds and diagonals, passing only the X or Y waveform is used for one dimension patterns, and the square root of the sum of the squares is used for circular patterns. The selection of the particular ALU function is provided by the microprocessor 18. Complex patterns, such as hearts, stars and triangles, may be generated by combining various wipe patterns and using more complex ALU functions.

The minimum and maximum values of WS are determined either by using a complex mathematical expression, taking all WS variables into account, or by "simulation." One way to determine the minimum and maximum WS values during the active screen is by selecting the ramp values from up to nine points on the screen, processing these values using the same logic as is implemented by the solid generator 14 with the current variables, and then comparing these values to find the minimum and maximum. For example, the values used may include the center point, the four corners of the screen and the four edge portions to the right, left, top and bottom of the center point. If the center point is outside the active screen, it is not included, nor are the edge intersection points included if they do not intersect an edge of the active screen. These minimum and maximum values describe the range of the clip generated by a lever-arm input to the microprocessor 18 for hard patterns without borders. Simply scaling the lever-arm to generate a clip value to match the range determined by the measured minimum and maximum values results in the undesired breathing pattern.

At the end of the lever-arm travel the pattern is required to be fully OFF or ON depending upon whether the pattern is reversed or not. For sharp pattern edges (high gain) the clip needs to range from just below the minimum to just above the maximum value as determined during the pattern measurement process described above. For soft edges (low gain) this range is insufficient. The clip and gain function may be described as follows:

$$\text{Output} = (\text{Input} - \text{Clip\_Level})*\text{Gain}/2 + \tfrac{1}{2}$$

where the output is limited to a range of zero to one and Clip\_Level and Input range from minus to plus one. For the Output to saturate at a value of one, the Input exceeds the Clip\_Level by a value of 1/Gain. For the Output to clip at a value of zero, the Clip\_Level exceeds the Input by a value of 1/Gain. Therefore the clip range is extended as follows:

$$\text{MAXIMUM} = \text{Maximum} + 1/\text{Gain}$$

$$\text{MINIMUM} = \text{Minimum} - 1/\text{Gain}$$

The clip range also is extended for borders. Since the lever-arm ranges from zero to one:

$$\text{Clip1} = \text{Lever\_Arm}*(\text{MAXIMUM} - (\text{MINIMUM} - \text{Border})) + (\text{MINIMUM} - \text{Border})$$

$$\text{Clip2} = \text{Lever\_Arm}*((\text{MAXIMUM} + \text{Border}) - \text{MINIMUM}) + \text{MINIMUM}$$

The Clip1 and Clip2 values are separated by the Border value, and Clip1 and Clip2 are limited to the maximum allowable range of the clip and gain function, i.e., minus to plus one. To reverse the pattern, Gain is inverted and Lever\_Arm is complemented:

$$\text{Reverse\_Gain} = -\text{Gain}$$

$$\text{Reverse\_Lever\_Arm} = 1 - \text{Lever\_Arm}$$

The microprocessor 18 calculates the values used by the solid generator 14 based on the most recent set of user inputs. These values are downloaded to the hardware from the microprocessor 18 during a vertical interval interrupt. The extent (minimum and maximum) of WS are measured within the active picture screen. The clip extensions for border size and softness (1/gain) are calculated. At this point the microprocessor 18 selects one of three scaling functions for the lever-arm depending upon whether input changes have been made that (i) do not cause pattern breathing without pattern reversal, (ii) do not cause pattern breathing with pattern reversal, or (iii) induce pattern breathing (reset pattern size as in selection of a new pattern). Using the appropriate scaled lever-arm value, the clip and gain values are calculated and downloaded to the hardware.

The wipe solid generator 10 may have multiple clip and gain functions associated with it. Each clip and gain function may have independent lever-arm values, softnesses and border sizes. Each clip and gain function then needs independent recursive memory for the lever-arm scaling function. Each lever-arm scaling function has as inputs (i) the lever-arm value, (ii) a pointer to the measured minimum and maximum WS values, and (iii) a pointer to the memory area specific to the particular clip and gain function. The last pointer references the previously calculated clip extensions due to border size and softness as well as recursive memory locations for Old_Clip, Old_Lever and Synth_Lever. The outputs of the scaling functions are stored in the three recursive memory locations.

1. No Pattern Breathing without Reversal

The basic concept is to calculate a virtual lever-arm position after a change in minimum or maximum WS values while maintaining the same clip levels, and then to change this virtual lever-arm value based on the change in position of the actual lever-arm. The new clip values are then based on the new synthesized lever-arm and the new minimum and maximum WS values.

The virtual lever-arm value after a minimum or maximum value change is determined as follows:

MINIMUM = Minimum—Softness_Extend—(Border_Extend/2)
MAXIMUM = Maximum + Softness_Extend + (Border_Extend/2)

Virtual_Lever_Arm = (Old_Clip—MINIMUM)/(MAXIMUM—MINIMUM)

For example if the old MAXIMUM was 0.75, the old MINIMUM was 0.25 and the previous lever-arm and clip values were 0.5, and the new MINIMUM after a pattern position change becomes zero, then Virtual_Lever_Arm becomes 0.667, since to maintain a clip level of 0.5 the virtual lever-arm needs to be at a two-thirds position. Once Virtual_Lever_Arm is determined, then six cases are considered when determining the outputs.

A. Actual Lever-Arm at Minimum End Stop

The system is reset by entering the following into the recursive memory for input to the next set of calculations:

Old_Clip = MINIMUM

Old_Lever = 0

Synth_Lever = 0

B. Else Actual Lever-Arm at Maximum End Stop

The system is reset by entering the following into the recursive memory for input to the next set of calculations:

Old_Clip = MAXIMUM

Old_Lever = 1

Synth_Lever = 1

C. Else (Old-Clip = <MINIMUM) and (Lever_Arm > = Old_Lever)

In this case the pattern is not started, yet the lever-arm is mid-way and may be decreasing. For example, this occurs when a partially open pattern is moved off screen. The following is entered into the recursive memory for input to the next set of calculation:

Old_Clip = Virtual_Lever_Arm*(MAXIMUM—MINIMUM) + MINIMUM

Old_Lever = Lever-Arm

Synth_Lever = Virtual_Lever_Arm

The value of Old_Clip may likely be less than MINIMUM since Virtual_Lever_Arm likely is less than zero.

D. Else (Old_Clip > = MAXIMUM) and (Lever_Arm > = Old_Lever)

In this case the pattern is complete, yet the lever-arm is mid-way and may be increasing. For example, this occurs when a large pattern is moved from off-screen to on-screen. The following is entered into the recursive memory for input to the next set of calculations:

Old_Clip = Virtual_Lever_Arm*(MAXIMUM—MINIMUM) + MINIMUM

Old_Lever = Lever_Arm

Synth_Lever = Virtual_Lever_Arm

The value of Old_Clip may be greater than MAXIMUM since Virtual_Lever_Arm likely is greater than one.

E. Else Lever_Arm > Old_Lever

In this case the pattern is partially open and the lever-arm is in transition and is increasing. The following is entered into the recursive memory for input to the next set of calculations:

Synth_Lever = Virtual_Lever_Arm + (Lever_Arm — Old_Lever)*(1 — Virtual_Lever_Arm)/(1 — Lever_Arm)

Old_Clip = Synth_Lever*(MAXIMUM — MINIMUM) + MINIMUM

Old_Lever = Lever_Arm

The synthesized lever-arm is based on the virtual lever-arm plus the lever-arm change scaled by the ratio of the distance of the virtual lever-arm to its end stop to the distance of the actual lever-arm to its end stop.

F. Else

In this case the pattern is partially open and the lever-arm is in transition and is decreasing or has not changed. The following is entered into the recursive memory for input to the next set of calculations:

$$Synth\_Lever = Virtual\_Lever\_Arm + (-(Lever\_Arm - Old\_Lever)*(Virtual\_Lever\_Arm - 0)/(Lever\_Arm - 0))$$

$$Old\_Clip = Synth\_Lever*(MAXIMUM - MINIMUM) + MINIMUM$$

$$Old\_Lever = Lever\_Arm$$

The synthesized lever-arm is based on the virtual lever-arm plus the lever-arm change scaled by the ratio of the distance of the virtual lever-arm to its beginning stop to the distance of the real lever-arm to its beginning stop.

2. No Pattern Breathing with Reversal

The basic concept is the same as the first scaling function. The virtual lever-arm value after a minimum or maximum change is determined as in the first scaling function. The corresponding six cases are determined as follows.

A. Actual Lever-Arm at Minimum End Stop

The system is reset by entering the following into the recursive memory for input to the next set of calculations:

$$Old\_Clip = MAXIMUM$$

$$Old\_Lever = 0$$

$$Synth\_Lever = 1$$

B. Else Actual Lever-Arm at Maximum End Stop

The system is reset by entering the following into the recursive memory for input to the next set of calculations:

$$Old\_Clip = MINIMUM$$

$$Old\_Lever = 1$$

$$Synth\_Lever = 0$$

C. Else (Old_Clip >= MAXIMUM) and (Lever_Arm = < Old_Lever)

In this case the pattern is not started (fully open), yet the lever-arm is midway and may be decreasing. For example, this occurs when a large pattern is moved from off-screen to on-screen. The following is entered into the recursive memory for input to the next set of calculations:

$$Old\_Clip = Virtual\_Lever\_Arm*(MAXIMUM - MINIMUM) + MINIMUM$$

$$Old\_Lever = Lever\_Arm$$

$$Synth\_Lever = Virtual\_Lever\_Arm$$

Old_Clip may likely be greater than MAXIMUM since Virtual_Lever_Arm likely is greater than one.

D. Else (Old_Clip = < MINIMUM) and (Lever_Arm > = Old_Lever)

In this case the pattern is complete (fully closed), yet the lever-arm is midway and may be increasing. For example, this occurs when a small pattern is moved off-screen. The following is entered into the recursive memory for input to the next set of calculations:

$$Old\_Clip = Virtual\_Lever\_Arm*(MAXIMUM - MINIMUM) + MINIMUM$$

$$Old\_Lever = Lever\_Arm$$

$$Synth\_Lever = Virtual\_Lever\_Arm$$

Old_Clip may likely be less than MINIMUM since Virtual_Lever_Arm likely is less than zero.

E. Else Lever_Arm > Old_Lever

In this case the pattern is partially open and the lever-arm is in transition and is increasing. The following is entered into the recursive memory for input to the next set of calculations:

$$Synth\_Lever = Virtual\_Lever\_Arm - ((Lever\_Arm - Old\_Lever)*(Virtual\_Lever\_Arm - 0)/(1 - Lever\_Arm))$$

$$Old\_Clip = Synth\_Lever*(MAXIMUM - MINIMUM) + MINIMUM$$

The synthesized lever-arm is based on the virtual lever-arm minus the lever-arm change scaled by the ratio of the distance of the virtual lever-arm to its beginning stop to the distance of the actual lever-arm to its end stop.

F. Else

In this case the pattern is partially open and the lever-arm is in transition and is decreasing or has not changed. The following is entered into the recursive memory for input to the next set of calculations:

$$Synth\_Lever = Virtual\_Lever\_Arm - ((Lever\_Arm - Old\_Lever)*(1 - Virtual\_Lever\_Arm)/(Lever\_Arm - 0))$$

$$Old\_Clip = Synth\_Lever*(MAXIMUM - MINIMUM) + MINIMUM$$

$$Old\_Lever = Lever\_Arm$$

The synthesized lever-arm is based on the virtual lever-arm minus the lever-arm change scaled by the ratio of the distance of the virtual lever-arm to its end stop to the distance of the actual lever-arm to its beginning stop.

3. Breathing Pattern (Reset Pattern Size)

The basic concept in this function is to determine a new clip value, as compared to lever-arm position, after a change in minimum or maximum WS values while maintaining the same virtual lever-arm value. The new clip value after such a change is:

$$\text{New\_Clip} = \text{Synth\_Lever}*(\text{MAXIMUM} - \text{MINIMUM}) + \text{MINIMUM}$$

For example if the old MAXIMUM was 0.75, the old MINIMUM was 0.25, and the synthetic lever-arm and clip values were 0.5, and the new MINIMUM after a pattern position change becomes zero, then the new clip value is 0.375 since Synth_Lever of 0.5 selects a clip value midway between the new MINIMUM and MAXIMUM values. In this case there are five cases to consider.

A. Actual Lever-Arm at Minimum End Stop

The system is reset by entering the following into the recursive memory for input to the next set of calculations:

Old_Clip = MINIMUM

Old_Lever = 0

Synth_Lever = 0

B. Else Actual Lever_Arm at Maximum End Stop

The system is reset by entering the following into the recursive memory for input to the next set of calculations:

Old_Clip = MAXIMUM

Old_Lever = 1

Synth_Lever = 1

C. Else New_Clip < MINIMUM

In this case the pattern is not started, yet the lever-arm is between end stops. For example, this occurs when a partially open pattern is moved off-screen and this function is called due to a new pattern selection. The system is reset as in Case A.

D. Else New_Clip > MAXIMUM

In this case the pattern transition is complete, yet the lever-arm is between end stops. For example, this occurs when a large off-screen pattern is moved on-screen and this function is called due to a new pattern selection. The system is reset as in Case B.

E. Else

In this case the pattern is partially open, the lever-arm is not at its end stops and a new pattern has been selected, engaging this function. The following is entered into the recursive memory for input to the next set of calculations:

Old_Clip = New_Clip

Old_Lever = Old_Lever

Synth_Lever = Synth_Lever

Synth_Lever and Old_Lever are not changed because this function does not handle lever-arm changes, but merely resets the size of a newly selected pattern.

Once the proper scaling function has been executed, then the clip levels are determined by Synth_Lever as well as Border_Extend and Soft_Extend, with special consideration given to reversed patterns. To ensure there is no hint of a pattern when Synth_Lever is at the extremes, the clip levels are set at −1 when Synth_Lever = 0 and at +1 when Synth_Lever = 1.

For non-reversed patterns:

MAXIMUM = Maximum + Softness_Extend

MINIMUM = Minimum − Softness_Extend − Border_Extend

Clip1 = Synth_Lever*(MAXIMUM − MINIMUM) + MINIMUM

Clip2 = Clip1 + Border_Extend

For reversed patterns:

MAXIMUM = Maximum + Softness_Extend + Border_Extend

MINIMUM = Minimum − Softness_Extend

Clip1 = Synth_Lever*(MAXIMUM − MINIMUM) + MINIMUM

Clip2 = Clip1 − Border_Extend

The gain is sent directly to the clip and gain functions for non-reversed patterns, and is inverted for reversed patterns.

Although a particular set of mathematical expressions have been given as an illustration of the present invention, these expressions may be altered so that the recursive variables may include the old minimum and maximum values or differences between a calculated lever-arm position and the actual position. Any implementation of pattern generation that is based on wipe solids and uses recursive values to dynamically scale the lever-arm is contemplated by the present invention.

Thus the present invention provides pattern generation using a wipe solid generator by dynamically scaling the lever-arm using wipe solids and recursive values so that a pattern transition ends or begins just as the lever-arm reaches its end stops while maintaining size consistency during changes in position, pattern selection and other modifiers including pattern reverse.

What is claimed is:

1. A method of pattern generation on a screen using a wipe solid generator and recursive memory comprising the step of:

generating parameters from operator inputs that define a wipe solid to be produced by the wipe solid generator;

measuring an extent of the wipe solid to produce a maximum and a minimum value;

extending the measured minimum and maximum values as a function of a desired border size and softness;

selecting a lever-arm scaling function as a function of changes in the operator inputs;

executing the selected lever-arm scaling function to produce parameters for storage in the recursive memory, the selected lever-arm scaling function using prior values of the parameters stored in the recursive memory; and determining clip levels from the parameters stored in the recursive memory so that movement of the lever-arm to a limit results in the wipe solid just including the entire screen.

2. The method of claim 1 wherein the lever-arm scaling function selected in the selecting step is selected from the group consisting of No Breathe w/o Reversal, No Breathe w/Reversal and Breathe.

3. The method of claim 2 wherein the executing step for the lever-arm scaling function No Breathe w/o Reversal comprises the steps of:
   determining a Virtual_Lever_Arm value from an Old_Clip value, which is one of the parameters stored in the recursive memory, and the extended minimum and maximum values;
   executing one of six cases based upon the position of the lever-arm and values of Old_Clip and Old_Lever parameteres from the recursive memory; and
   determining a value for the parameter Synth_Lever in the recursive memory, which parameter is used in the clip levels determining step.

4. The method of claim 2 wherein the executing step for the lever-arm scaling function No Breathe w/Reversal comprises the steps of:
   determining a Virtual_Lever_Arm value from an Old_Clip value, which is one of the parameters stored in the recursive memory, and the extended minimum and maximum values;
   executing one of six cases based upon the position of the lever-arm and values of Old_Clip and Old_Lever parameteres from the recursive memory; and
   determining a value for the parameter Synth_Lever in the recursive memory, which parameter is used in the clip levels determining step.

5. The method of claim 2 wherein the executing step for the lever-arm scaling function Breathe comprises the steps of:
   determining a New_Clip value from a Synth_Lever value, stored as one of the parameters in the recursive memory, and the extended minimum and maximum values;
   executing one of five cases based upon the position of the lever-arm and the New_Clip value; and
   determining a new value for the parameter Synth_Lever, which parameter is used in the clip levels determining step.

* * * * *